US009982745B2

United States Patent
Kanaya et al.

(10) Patent No.: US 9,982,745 B2
(45) Date of Patent: May 29, 2018

(54) FLUID-FILLED VIBRATION DAMPING DEVICE

(71) Applicant: SUMITOMO RIKO COMPANY LIMITED, Komaki-shi, Aichi (JP)

(72) Inventors: Tomohiro Kanaya, Komaki (JP); Kenji Oki, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 0 days. days.

(21) Appl. No.: 15/364,753

(22) Filed: Nov. 30, 2016

(65) Prior Publication Data
US 2017/0335920 A1    Nov. 23, 2017

(30) Foreign Application Priority Data
May 20, 2016    (JP) ................................. 2016-101866

(51) Int. Cl.
*F16F 9/00*    (2006.01)
*F16F 13/10*    (2006.01)
*B60K 5/12*    (2006.01)

(52) U.S. Cl.
CPC .......... *F16F 13/107* (2013.01); *B60K 5/1208* (2013.01); *F16F 13/10* (2013.01)

(58) Field of Classification Search
CPC ........ F16F 13/08; F16F 13/085; F16F 13/101; F16F 13/103; F16F 13/105; F16F 13/106; B60K 5/1208
USPC ................. 267/140.11–140.15, 140.2–140.5, 267/141.1–141.7
See application file for complete search history.

(56) References Cited

U.S. PATENT DOCUMENTS

| 7,350,776 B2 * | 4/2008 | Muramatsu ........... F16F 13/105 267/140.14 |
| 8,556,239 B2 * | 10/2013 | Okumura .............. F16F 13/106 267/140.13 |
| 2004/0239021 A1 * | 12/2004 | Itoh ....................... F16F 13/106 267/140.13 |

(Continued)

FOREIGN PATENT DOCUMENTS

JP    4113889 B2    7/2008

OTHER PUBLICATIONS

U.S. Appl. No. 15/209,031 filed Jul. 13, 2016 filed in the name of Wakako Michiyama et al.

*Primary Examiner* — Christopher P Schwartz
(74) *Attorney, Agent, or Firm* — Oliff PLC

(57) ABSTRACT

A fluid-filled vibration-damping device including: a first mounting member; a second mounting member; a main rubber elastic body elastically connecting the two mounting members; a fluid chamber whose wall is constituted by the main rubber elastic body at a portion and by a flexible film at another portion, the fluid chamber being filled with a non-compressible fluid; a fixation member being attached to an outer peripheral rim of the flexible film and being disposed inside or outside the tubular second mounting member such that the fixation member is superposed to the second mounting member in an axis-perpendicular direction; an insertion hole formed in the second mounting member and the fixation member; and a positioning member inserted through the insertion hole so as to relatively position the second mounting member and the fixation member at a scaling position by axial locking.

7 Claims, 10 Drawing Sheets

(56) References Cited

U.S. PATENT DOCUMENTS

| | | | |
|---|---|---|---|
| 2006/0097436 A1* | 5/2006 | Yamamoto | F16F 13/101 267/140.12 |
| 2010/0201053 A1* | 8/2010 | Okumura | F16F 13/106 267/140.13 |
| 2015/0028530 A1* | 1/2015 | Kanaya | F16F 13/103 267/140.13 |
| 2015/0252866 A1* | 9/2015 | Muraoka | F16F 13/103 267/140.13 |

* cited by examiner

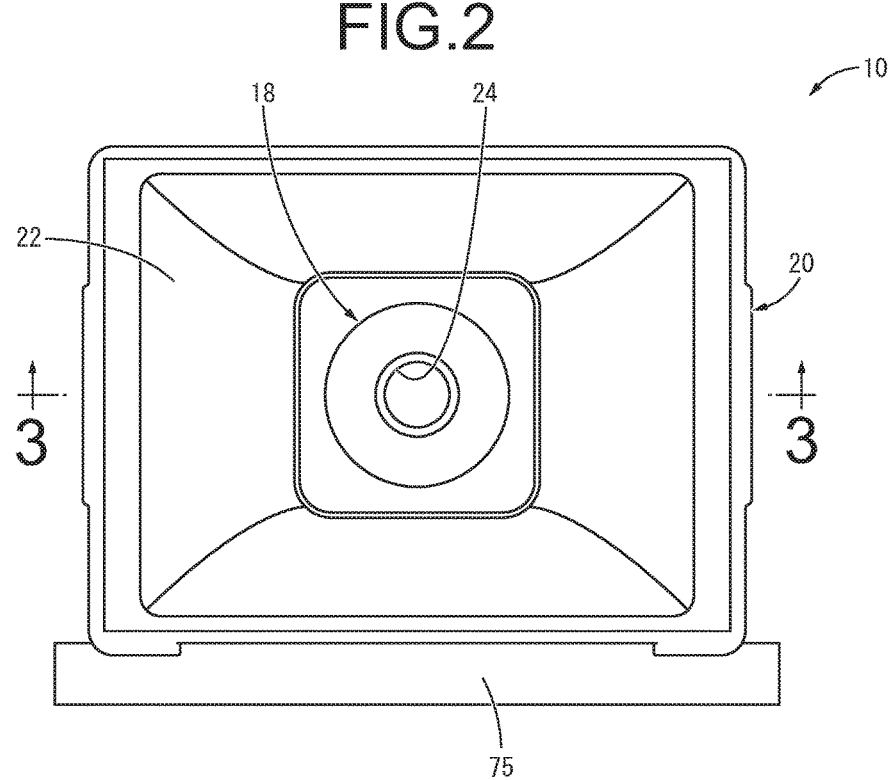
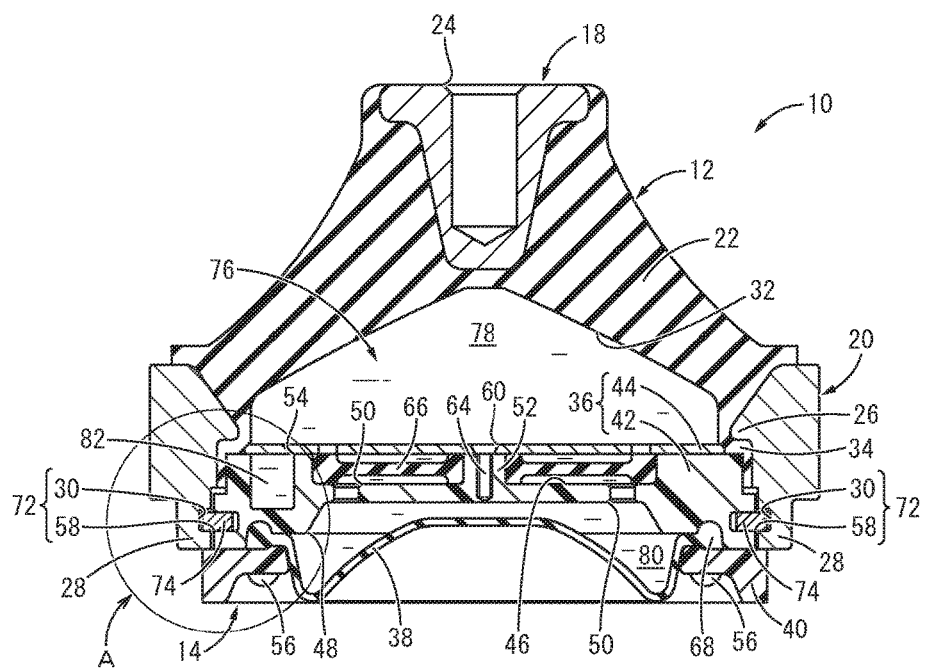

FLUID-FILLED VIBRATION DAMPING DEVICE

INCORPORATED BY REFERENCE

The disclosure of Japanese Patent Application No. 2016-101866 filed on May 20, 2016 including the specification, drawings and abstract is incorporated herein by reference in its entirety.

BACKGROUND OF THE INVENTION

1. Field of the Invention

The present invention relates to a fluid-filled vibration-damping device that exhibits excellent vibration-damping effect using a flow action such as resonance of the fluid filled inside.

2. Description of the Related Art

From the past, a vibration-damping device is known as one type of vibration-damping connecting body or vibration-damping support body interposed between members constituting the vibration transmission system for vibration damping connecting those members to each other. The vibration-damping device has a structure wherein a first mounting member and a second mounting member are linked by the main rubber elastic body in a vibration-damping manner.

With the vibration-damping device, a fluid-filled vibration-damping device that uses vibration-damping effect based on the flow action of the fluid filled inside to improve vibration-damping performance is also proposed and employed for an automotive engine mount etc. An example of the fluid-filled vibration-damping device is a hydraulic pressure attenuation bearing shown in Japanese Patent No. JP-B-4113889, which has a structure wherein an action chamber whose wall is partially constituted by an elastic support body is formed on the upper side of a partition wall supported by a second mounting part, and a compensation chamber whose wall is constituted by a bellows is formed on the lower side of the partition wall. The hydraulic pressure attenuation bearing further includes an attenuation passage communicating the action chamber and the compensation chamber with one another, and relative pressure fluctuation between the action chamber and the compensation chamber, which is caused when a vibration is input, makes an attenuation fluid filled in the action chamber and the compensation chamber flow via the attenuation passage.

With the hydraulic pressure attenuation bearing of JP-B-4113889, in order to seal the attenuation fluid in the action chamber and the compensation chamber formed inside, a plurality of members constituting the walls of the action chamber and the compensation chamber need to be connected in a fluid-tight manner. For example, in the structure shown in FIGS. 1 and 2 of JP-B-4113889, a cover rim of a bearing cover is covered by a case edge of a bearing case, whereby the elastic support body, the partition wall, and the bellows that constitute the walls of the action chamber and the compensation chamber are linked and supported in a fluid-tight manner at their outer peripheral parts. Also, in the structure shown in FIGS. 3 to 6 of JP-B-4113889, an outside ring fixed to the outer peripheral part of the elastic support body and the cover rim of the bearing cover are locked in one another in the axial direction, so that the elastic support body, the partition wall, and the bellows that constitute the walls of the action chamber and the compensation chamber are linked and supported in a fluid-tight manner at their outer peripheral parts.

However, in the structure according to FIGS. 1 and 2 of JP-B-4113889, the bearing case constituting the second mounting part must be formed of a material that can permit deformation of the case edge, and the freedom degree about selection of the forming material is small. In addition, it is necessary to particularly provide the bearing case with the case edge, which is a structure for linking and fixing, and to deform the case edge when the elastic support body, the partition wall, the bellows, and the bearing cover are inserted into the bearing case so as to lock the bearing case in the bearing cover in the axial direction.

Also, in the structure according to FIGS. 3 to 6 of JP-B-4113889, a claw-shaped locking structure is required for one of the outside ring and the cover rim in order to lock the outside ring in the cover rim in the axial direction, so that it is likely to suffer from complicated structure and size growing in the axis-perpendicular direction.

SUMMARY OF THE INVENTION

It is therefore one object of the present invention to provide a fluid-filled vibration-damping device of novel structure which is able to realize the fluid-filled structure by a simple and compact structure with a great degree of design freedom.

The above and/or optional objects of this invention may be attained according to at least one of the following modes of the invention. The following modes and/or elements employed in each mode of the invention may be adopted at any possible optional combinations.

Specifically, a first mode of the present invention provides a fluid-filled vibration-damping device comprising: a first mounting member; a second mounting member; a main rubber elastic body elastically connecting the first and second mounting members; a fluid chamber for which a portion of its wall is constituted by the main rubber elastic body, while another portion of its wall is constituted by a flexible film, the fluid chamber being filled with a non-compressible fluid; a fixation member being attached to an outer peripheral rim of the flexible film and being disposed internally or externally in relation to the tubular second mounting member such that the fixation member is superposed to the second mounting member in an axis-perpendicular direction; an insertion hole formed in the second mounting member and the fixation member; and a positioning member inserted through the insertion hole so as to position the second mounting member and the fixation member at a sealing position relative to each other by axial locking.

According to the fluid-filled vibration-damping device of this structure defined in the first mode, the fixation member that is disposed internally or externally in relation to the second mounting member is avoided from becoming dislodged out of the second mounting member by locking with respect to the positioning member. This stably keeps the linked state of the second mounting member and the fixation member.

Moreover, the second mounting member and the fixation member are positioned relative to one another by the positioning member inserted through the insertion hole, thereby keeping the fluid-tightly sealed state of the space between those second mounting member and fixation member. Therefore, compared to the conventional structure wherein the second mounting member and the fixation member are connected by means of clinching, or the like, the freedom degree of selection for the forming material and the shape of the second mounting member and the fixation member becomes larger. In addition, the second mounting member and the fixation member are positioned by insertion of the positioning member, so that size reduction is also possible compared to the case of locking with clinching or a claw structure.

A second mode of the present invention provides the fluid-filled vibration-damping device according to the first mode, further comprising a partition member provided for dividing the fluid chamber into a pressure-receiving chamber whose wall is partially constituted by the main rubber elastic body and an equilibrium chamber whose wall is partially constituted by the flexible film, wherein an outer peripheral part of the flexible film is clamped between the partition member and a pressing member that is fixed to the partition member while being overlapped with the partition member, and the fixation member is constituted by including the partition member and the pressing member.

According to the second mode, since the flexible film is clamped between the partition member and the pressing member that is fixed to the partition member, it is possible to treat those partition member and flexible film in whole together, so that it facilitates the manufacture operation, for example. Additionally, since the partition member and the pressing member are fixed to each other, by positioning either one of the partition member and the pressing member to the second mounting member by the positioning member, it is possible to integrally position the three members including the partition member, the flexible film, and the pressing member to the second mounting member.

A third mode of the present invention provides the fluid-filled vibration-damping device according to the second mode, wherein the insertion hole of the fixation member is formed in the partition member.

With the third mode, it is possible to relatively position the second mounting member and the fixation member by the positioning member, without extension of the second mounting member up to the location of the pressing member, so that it is possible to obtain smaller and lighter fluid-filled vibration-damping device.

A fourth mode of the present invention provides the fluid-filled vibration-damping device according to any one of the first to third modes, wherein the insertion hole is formed between an inner peripheral surface of the second mounting member and an outer peripheral surface of the fixation member that are overlapped with each other.

With the fourth mode, each of the second mounting member and the fixation member is locked in relation to the respective side part in the width direction of the positioning member inserted through the insertion hole. Consequently, deviation in alignment between the second mounting member and the fixation member due to deformation of the positioning member is less likely to occur, and a seal structure with excellent reliability can be obtained. Besides, the insertion hole may be formed by the groove opening to the inner peripheral surface of the second mounting member and the groove opening to the outer peripheral surface of the fixation member, so that this insertion hole is more easily formed than the insertion hole of the structure piercing through the second mounting member and the fixation member.

A fifth mode of the present invention provides the fluid-filled vibration-damping device according to the fourth mode, wherein the inner peripheral surface of the second mounting member and the outer peripheral surface of the fixation member expand linearly in an extension direction of the insertion hole in a formation part of the insertion hole.

With the fifth mode, the positioning member and the second mounting member and the fixation member are locked in a wide range in the length direction of the positioning member, and the locking area is kept large, thereby allowing load dispersion so as to improve durability and reliability in positioning etc.

A sixth mode of the present invention provides the fluid-filled vibration-damping device according to any one of the first to fifth modes, wherein the insertion hole is formed on each of both sides about a central axis of the tubular second mounting member.

According to the sixth mode, the second mounting member and the fixation member are positioned by the positioning member on both sides of the central axis. Therefore, the second mounting member and the fixation member are positioned more stably, thereby improving reliability for the seal structure of the fluid chamber.

A seventh mode of the present invention provides the fluid-filled vibration-damping device according to any one of the first to sixth modes, further comprising a bracket mounted to the second mounting member, wherein in a state where the bracket is mounted, the second mounting member and the fixation member are stably positioned at the sealing position relative to each other so that a space between the second mounting member and the fixation member is sealed in a fluid-tight manner, while the positioning member inserted through the insertion hole is extractable from the insertion hole.

According to the seventh mode, the positioning member is drawn out from the insertion hole in a state where the bracket stably positions the second mounting member and the fixation member relative to one another. This lightens the vibration-damping device and also allows repeated use of the positioning member.

According to the present invention, the second mounting member and the fixation member are relatively positioned by the positioning member inserted through the insertion hole, and this positioning keeps the fluid-tightly sealed state of the space between those second mounting member and fixation member. Therefore, the freedom degree of selection for the forming material and the shape of the second mounting member and the fixation member becomes larger. Moreover, the second mounting member and the fixation member are positioned by insertion of the positioning member, thereby realizing size reduction of the fluid-filled vibration-damping device.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIG. 2 is a plan view of the engine mount shown in FIG. 1;

FIG. 3 is a cross sectional view taken along line 3-3 of FIG. 2;

DETAILED DESCRIPTION OF PREFERRED EMBODIMENTS

Figure 1:
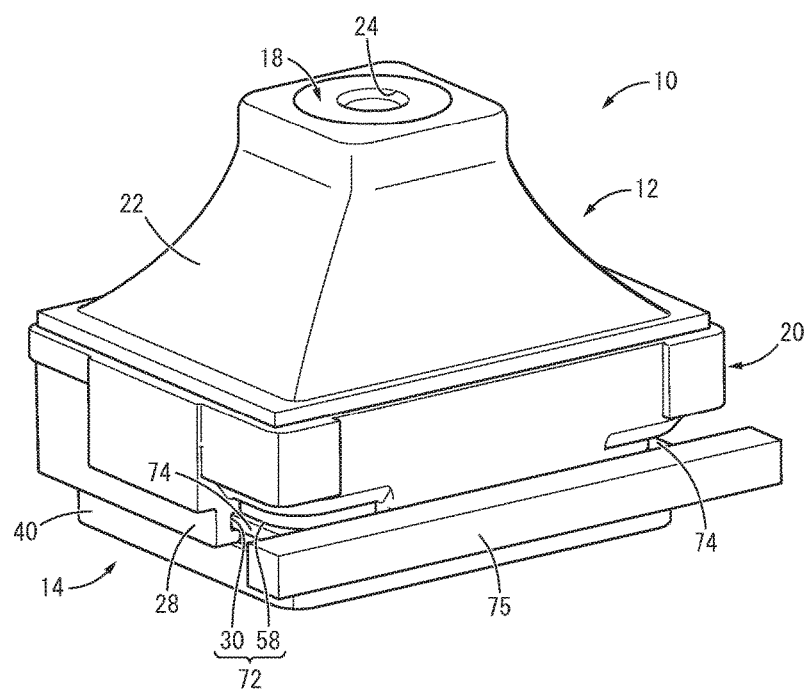
FIG. 1 is a perspective view showing a fluid-filled vibration-damping device in the form of an engine mount as a first embodiment of the present invention.

There will be described embodiments of the present invention while referring to the drawings.

FIGS. 1 to 3 show an automotive engine mount 10 as a first embodiment of a fluid-filled vibration-damping device according to the present invention. This engine mount 10 is constructed by combining a mount main body 12 shown in FIG. 4 and a fluid-filled assembly 14 shown in FIGS. 5 and 6. In the description hereafter, as a general rule, the up-down direction means the up-down direction in FIG. 3 that is the main vibration input direction, the front-back direction means the up-down direction in FIG. 2, and the left-right direction means the left-right direction in FIG. 2, respectively.

More specifically, the mount main body 12 includes a first mounting member 18, a second mounting member 20, and a main rubber elastic body 22 that provides elastic linkage therebetween. The mount main body 12 is constituted by an integrally vulcanization molded component of the main rubber elastic body 22 incorporating the first mounting member 18 and the second mounting member 20 in this embodiment.

As FIGS. 2 and 3 show, the first mounting member 18 is a member of high rigidity formed of a metal, a synthetic resin, or the like in a substantial shape of a truncated cone turned upside down, which has a screw hole 24 that opens to the upper face formed on the central axis thereof.

The second mounting member 20 is a member of high rigidity formed of a metal, a synthetic resin, or the like, having a substantially rectangular tube shape on the whole. In the present embodiment, the dimension in the left-right direction of the second mounting member 20 is larger than the dimension in the front-back direction thereof, so that the second mounting member 20 has a substantially rectangular tube shape that includes a substantially rectangular profile in a plan view. The second mounting member 20 has a seal protrusion 26 that protrudes to the inner periphery formed integrally therewith. The upper face of the seal protrusion 26 has a tapered shape and the lower face thereof expands roughly in the axis-perpendicular direction.

On the left and right sides of the second mounting member 20, an engaging part 28 is respectively formed projecting downward as FIGS. 1 and 3 show. This engaging part 28 is formed at a position biased forward as shown in FIG. 1, and the back end of the engaging part 28 (the lower end in FIG. 2) is positioned on the front side (the upper side in FIG. 2) compared to the back end of the second mounting member 20. Each engaging part 28 of the second mounting member 20 has an outer concave groove 30 formed opening inward in the facing direction and extending in the front-back direction.

The first mounting member 18 and the second mounting member 20 are disposed roughly on the same central axis separately in the up-down direction, while having the main rubber elastic body 22 formed therebetween, as FIGS. 2 and 3 show. The main rubber elastic body 22 is a rubber elastic body with a substantial shape of a truncated quadrangular pyramid. At the small diameter side end of the main rubber elastic body 22, the first mounting member 18 is vulcanization-bonded as buried therein, while at the large diameter side end thereof, the upper part of the second mounting member 20 is vulcanization-bonded as overlapped with the end.

Additionally, in the main rubber elastic body 22, a large diameter concavity 32, which is concave in a rectangular shape, is formed opening to the lower face. For this large diameter concavity 32, the top base part has a tapered cross section that expands as it goes to the opening side, or the lower side, in a longitudinal cross section, i.e., FIG. 3. Meanwhile, the opening part extends in the up-down direction with a roughly constant shape of a transverse surface, namely, a cross section in the axis-perpendicular direction. Note that both the bottom end face of the first mounting member 18 and the inner peripheral face of the upper part of the second mounting member 20 are covered with the main rubber elastic body 22, and neither the first mounting member 18 nor the second mounting member 20 is exposed to the inner face of the large diameter concavity 32.

Furthermore, the lower part of the second mounting member 20 positioned lower than the opening of the large diameter concavity 32 is covered with a seal rubber layer 34, which is integrally formed with the main rubber elastic body 22. Note that the seal rubber layer 34 does not reach the engaging part 28 of the second mounting member 20, so that the engaging part 28 is exposed from the main rubber elastic body 22.

Figure 7:
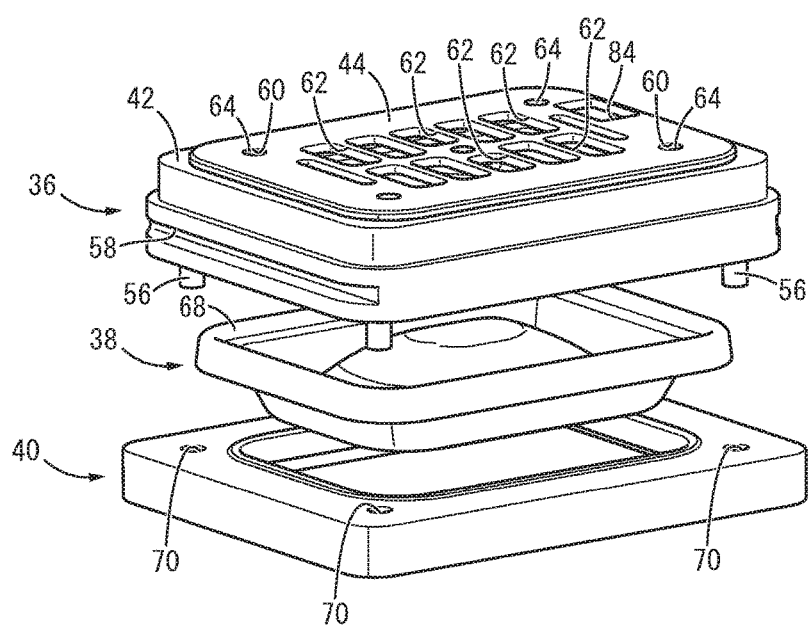
FIG. 7 is an exploded perspective view of the orifice assembly shown in FIG. 5.

Meanwhile, the fluid-filled assembly 14 is structured by integrally linking a partition member 36, a flexible film 38, and a pressing member 40, as FIG. 7 shows.

Figure 6:
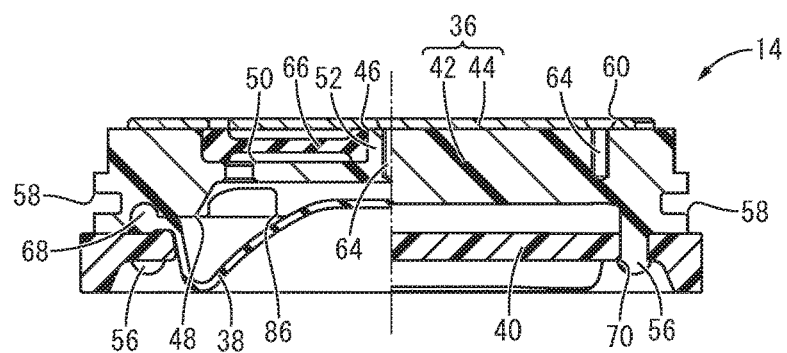
FIG. 6 is a cross sectional view taken along line 6-6 of FIG. 5.

The partition member 36 has a structure wherein a partition member main body 42 and a lid plate member 44 are superposed and fixed to one another in the up-down direction, as FIGS. 3 and 6 show. The partition member main body 42 is a hard member having a substantial shape of a rectangular plate formed of a synthetic resin or a metal. By having a housing concavity 46 formed opening to the upper surface of the inner peripheral part and a lightening concavity 48 formed opening to the lower surface of the inner peripheral part, the partition member main body 42 has the inner peripheral part thinner in the up-down direction than the outer peripheral part. Additionally, in the bottom wall of the housing concavity 46 in the partition member main body 42, a plurality of lower through holes 50 are formed therethrough in the up-down direction. Provided at the center of the housing concavity 46 is a central connecting part 52 in a substantial shape of a circular post that protrudes upward from the bottom face.

Moreover, at the thick outer peripheral part in the partition member main body 42, a peripheral groove 54 is formed extending in the peripheral direction while opening to the upper surface thereof. This peripheral groove 54 extends on the outer peripheral side of the housing concavity 46 by a prescribed length that is shorter than one periphery. At the corners of the outer peripheral part of the partition member main body 42, junction projections 56 are formed integrally therewith each in a substantial shape of a circular post projecting downward.

Furthermore, in the outer peripheral part of the partition member main body 42, inner concave grooves 58 are formed. The inner concave grooves 58 open to the left and right outer surfaces of the partition member main body 42 and they are formed continuously across the entire length in the front-back direction of the partition member main body 42.

The lid plate member 44 has a thin roughly-rectangular plate shape, wherein a plurality of fixing holes 60 are formed penetrating in the up-down direction in the central part and the outer peripheral part. At the part that covers the housing concavity 46 when the lid plate member 44 is fixed to the partition member main body 42 as described later, a plurality of upper through holes 62 are formed penetrating in the up-down direction.

The lid plate member 44 is superposed to the upper surface of the partition member main body 42 and fixing bolts 64 are inserted through the fixing holes 60 of the lid plate member 44 and threaded onto the partition member main body 42. By so doing, the partition member main body 42 and the lid plate member 44 are fixed as superposed to one another. By superposing the partition member main body 42 and the lid plate member 44 to one another, the opening of the housing concavity 46 of the partition member main body 42 is covered by the lid plate member 44. Thus, a movable film 66 to be housed within the housing concavity 46 of the partition member main body 42 is disposed between the partition member main body 42 and the lid plate member 44 in the up-down direction. This movable film 66 takes the form of a substantially annular plate being thickened respectively in the inner peripheral edge and the outer peripheral edge to project upward and downward thereat. The movable film 66 is disposed externally about the central connecting part 52 of the partition member main body 42, and the inner peripheral edge and the outer peripheral edge thereof are clamped between the partition member main body 42 and the lid plate member 44 in the up-down direction, so that the movable film 66 is supported by the partition member 36.

The flexible film 38 is a thin rubber film taking the form of a substantially rectangular dome, including a slack in the up-down direction and being easily deformable in the thickness direction. Additionally, at the outer peripheral rim of the flexible film 38, a thick clamped part 68 is integrally formed continuously along the entire periphery.

As FIGS. 6 and 7 show, the pressing member 40 has a substantial shape of a rectangular frame, wherein the inner peripheral part is thinned compared to the outer peripheral part in the up-down direction and positioned as high as the upper end of the outer peripheral part. The thin inner peripheral part thereof has a plurality of junction holes 70 formed therethrough in the up-down direction.

The partition member 36, the flexible film 38, and the pressing member 40 structured like this are superposed and connected to each other in the up-down direction, thereby constituting the fluid-filled assembly 14. Specifically, the junction projections 56 of the partition member main body 42 are inserted through the junction holes 70 of the pressing member 40, and then the projecting tips of the junction projections 56 are expanded in diameter by laser heating etc., thereby jointing and fixing the partition member 36 and the pressing member 40 to one another. In addition, the clamped part 68 of the flexible film 38 is clamped between the outer peripheral part of the partition member main body 42 and the inner peripheral part of the pressing member 40 in the up-down direction. Consequently, the outer peripheral rim of the flexible film 38 is clamped by the partition member 36 and the pressing member 40 to mutually joint those partition member 36, flexible film 38, and pressing member 40. Thus, in the present embodiment, the fixation member to be attached to the outer peripheral rim of the flexible film 38 comprises the partition member 36 and the pressing member 40.

The fluid-filled assembly 14 is, as shown in FIG. 3, attached to the mount main body 12 in a state where the partition member 36 is inserted into the second mounting member 20. By so doing, the partition member 36 is overlapped with the second mounting member 20 as viewed in the axis-perpendicular direction, and in the present embodiment, the outer peripheral surface of the partition member 36 is overlapped with the inner peripheral surface of the second mounting member 20. As is apparent also from the structure of this embodiment, the fixation member will do as long as at least one portion thereof is disposed internally or externally relative to the second mounting member 20.

Here, between the inner peripheral surface of the second mounting member 20 and the outer peripheral surface of the partition member 36 that are overlapped, pin insertion holes 72 are formed as insertion holes. By inserting positioning pins 74 as positioning members into the pin insertion holes 72, the second mounting member 20 and the partition member 36 are relatively positioned in the axial direction.

The pin insertion holes 72 are formed by matching the opening of the outer concave groove 30 that is formed in the engaging part 28 of the second mounting member 20 and the opening of the inner concave groove 58 that is formed in the partition member main body 42 in relation to one another. In the present embodiment, a pair of separate pin insertion holes 72, 72 are formed as parallel and mutually separate in the left-right direction. The left and right pin insertion holes 72, 72 are formed at the left and right outer end parts of the engine mount 10, and they are formed separately from the mount central axis, namely the central axis of the second mounting member 20, to the left and right sides, substantially in a mutually symmetrical structure.

The formation parts of the outer concave grooves 30 in the left and right inner surfaces of the second mounting member 20 and the formation parts of the inner concave grooves 58 in the left and right outer surfaces of the partition member main body 42 each extend linearly in the front-back direction. The pin insertion holes 72 extend linearly in the front-back direction with a substantially constant cross sectional shape to pass through in the front-back direction. In this embodiment, since the shape of the second mounting member 20 is substantially a rectangular tube while the shape of the partition member main body 42 is substantially a rectangular plate, each of the left and right inner surfaces of the second mounting member 20 where the outer concave grooves 30 are formed and the left and right outer surfaces of the partition member main body 42 where the inner concave grooves 58 are formed extends linearly in the front-back direction.

Figure 4:
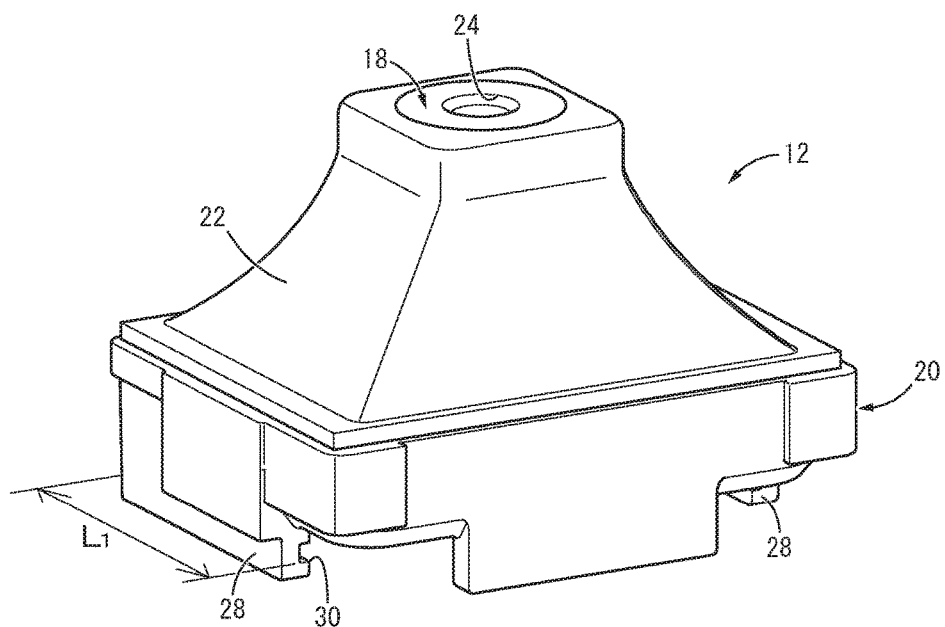
FIG. 4 is a perspective view of an integrally vulcanization molded component constituting the engine mount shown in FIG. 1.
Figure 8:
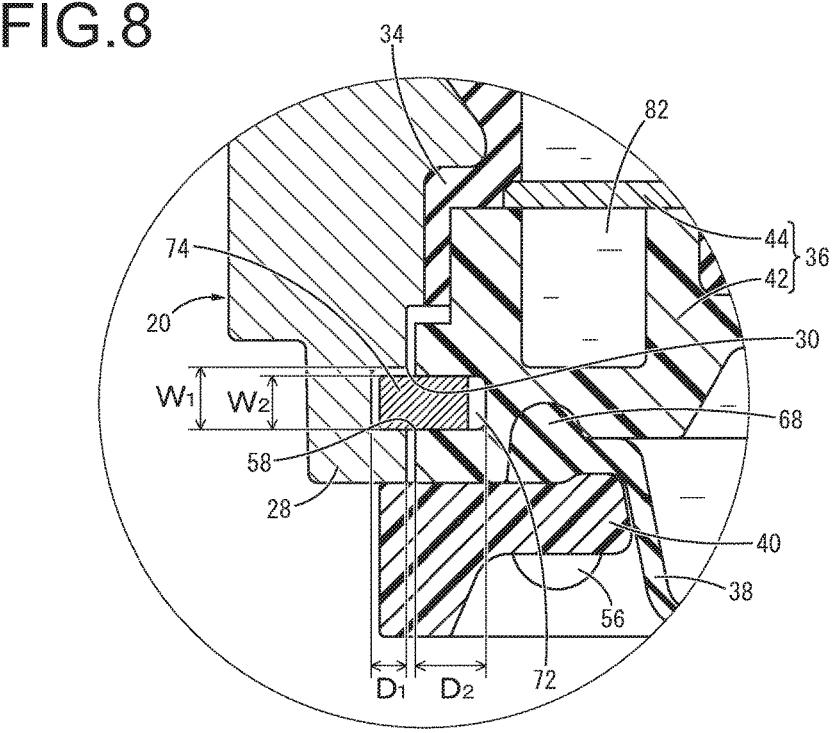
FIG. 8 is an enlarged fragmental cross sectional view of a principal part, or Part A of FIG. 3.

With the present embodiment, as shown in FIG. 8, the up-down width dimension $W_1$ for the openings located inside in the left-right direction of the outer concave grooves 30 is larger than the up-down width dimension $W_2$ for the openings located outside in the left-right direction of the inner concave grooves 58 ($W_1 > W_2$). Also in this embodiment, the depth dimension $D_1$ of the outer concave grooves 30 formed in the second mounting member 20 formed of a metal is smaller than the depth dimension $D_2$ of the inner concave grooves 58 formed in the partition member main body 42 formed of a synthetic resin ($D_1 < D_2$). Moreover, the front-back length $L_1$ of the outer concave grooves 30 shown in FIG. 4 is shorter than the front-back length $L_2$ of the inner concave grooves 58 shown in FIG. 5 ($L_1 < L_2$), and the back ends of the outer concave grooves 30 are located forward than the back ends of the inner concave grooves 58.

Figure 9:
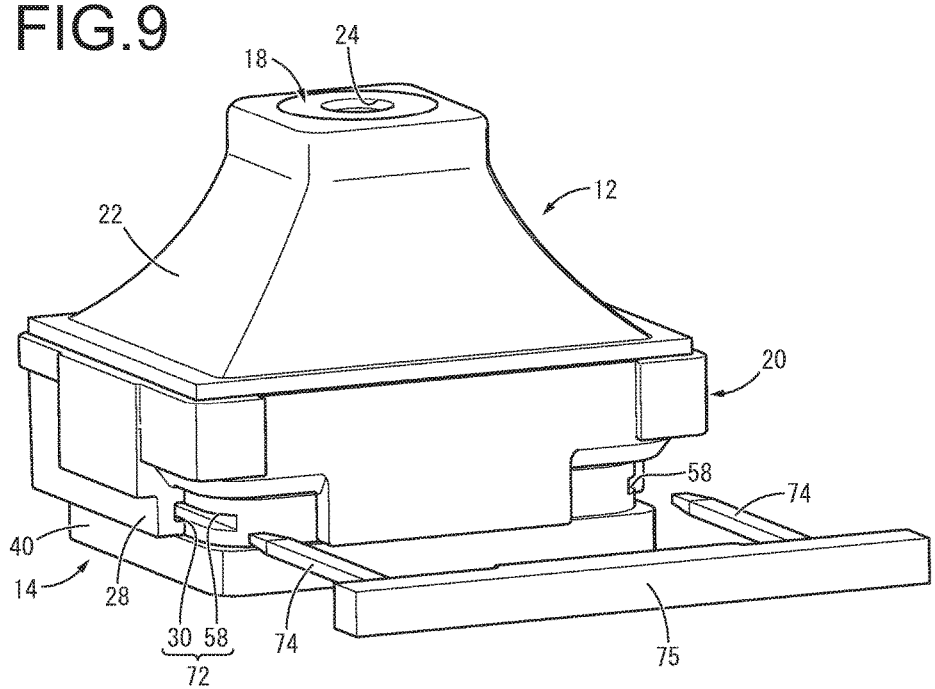
FIG. 9 is a perspective view showing a step of fixing the integrally vulcanization molded component shown in FIG. 4 and the orifice assembly shown in FIG. 5 to one another with positioning pins.

The positioning pin 74 is a member of high rigidity formed of a metal etc. extending linearly with a substantially rectangular cross section roughly corresponding to the pin insertion hole 72. The tip part of the positioning pin 74 is tapered and easily inserted into the pin insertion hole 72. With respect to the structure of the positioning pin 74 of this embodiment, a pair of left and right positioning pins 74 are connected to each other by a proximal end connecting part 75, as FIG. 9 shows. This pair of left and right positioning pins 74, 74 are relatively positioned and disposed to be parallel. In other words, the pair of left and right positioning pins 74, 74, which are disposed as separate in the left-right direction and parallel to each other, protrude from the proximal end connecting part 75, with their proximal ends integrally supported by the proximal end connecting part 75.

The positioning pins 74, 74 are inserted into the pin insertion holes 72, 72, so that the second mounting member 20 and the partition member 36 are locked in relation to the positioning pins 74, 74 in the axial direction. By so doing, the second mounting member 20 and the partition member 36 are relatively positioned in the axial direction by the positioning pins 74. Specifically, the outside parts in the left-right direction of the positioning pins 74, 74 are inserted into the outer concave grooves 30 of the second mounting member 20, while the inside parts in the left-right direction of the positioning pins 74, 74 are inserted into the inner concave grooves 58 of the partition member 36. Since the back ends of the outer concave grooves 30 are located forward than the back ends of the inner concave grooves 58, the positioning pins 74, 74 are inserted into the inner concave grooves 58 and later into the outer concave grooves 30.

In the present embodiment, the groove width dimension $W_1$ of the outer concave grooves 30 is larger than the groove width dimension $W_2$ of the inner concave grooves 58 into which the positioning pins 74, 74 are inserted before being inserted into the outer concave grooves 30. Therefore, the positioning pins 74 inserted through the inner concave grooves 58 are easily inserted into the outer concave grooves 30.

The positioning pins 74, 74 are inserted through the pin insertion holes 72, 72 in this way, thereby positioning the second mounting member 20 and the partition member 36 in appropriate axial positions relative to one another. As a result, the seal rubber layer 34 bonded to the second mounting member 20 is clasped between the second mounting member 20 and the partition member 36 to keep the space between the second mounting member 20 and the partition member 36 sealed in a fluid-tight manner. Especially by relatively positioning the second mounting member 20 and the partition member 36 in the axial direction, the seal rubber layer 34 is compressed in the up-down direction between the seal protrusion 26 of the second mounting member 20 and the upper surface of the partition member 36 to seal the gap between the second mounting member 20 and the partition member 36.

In short, the second mounting member 20 and the partition member 36 are locked relative to the positioning pins 74, 74 inserted through the pin insertion holes 72, 72 in the axial direction, and thus relatively positioned in a sealing position such that the space between the second mounting member 20 and the partition member 36 is sealed in a fluid-tight manner.

In this way, the fluid-filled assembly 14 is attached to the mount main body 12, thereby forming a fluid chamber 76 that is separated from the outside in a fluid-tight manner between the main rubber elastic body 22 and the flexible film 38 in the axial direction. For this fluid chamber 76, a portion of the wall is constituted by the main rubber elastic body 22, while another portion of the wall is constituted by the flexible film 38, and a non-compressible fluid or liquid is sealed therein. Note that the non-compressible fluid to be filled in the fluid chamber 76, i.e., the sealed fluid is not particularly limited, although preferably adopted are water, ethylene glycol, propylene glycol, alkylene glycol, polyalkylene glycol, silicone oil, and a mixture liquid thereof, for example. In addition, the sealed fluid is desirably a low-viscosity fluid so as to advantageously obtain vibration-damping effect based on the flowing action of the fluid, which will be described later. That is, more preferably adopted is a low-viscosity fluid having viscosity of 0.1 Pa·s or lower.

The partition member 36 is disposed to expand substantially in the axis-perpendicular direction in the fluid chamber 76, so that the fluid chamber 76 is divided in two in the up-down direction by the partition member 36. Consequently, formed on the upper side of the partition member 36 is a pressure-receiving chamber 78 whose wall is partially constituted by the main rubber elastic body 22 for which a vibration input in the up-down direction causes internal pressure fluctuation. On the other hand, formed on the lower side of the partition member 36 is an equilibrium chamber 80 whose wall is partially constituted by the flexible film 38, which allows capacity change and keeps substantially constant internal pressure. The filling of the non-compressible fluid into the pressure-receiving chamber 78 and the equilibrium chamber 80 is realized for example by performing the connection work for the mount main body 12 and the fluid-filled assembly 14 using the positioning pins 74, 74 in a cistern filled with the non-compressible fluid. However, it is also possible to inject the non-compressible fluid into the pressure-receiving chamber 78 and the equilibrium chamber 80 with a syringe etc, after connecting the mount main body 12 and the fluid-filled assembly 14 by the positioning pins 74, 74 in a fluid-tight manner.

Figure 5:
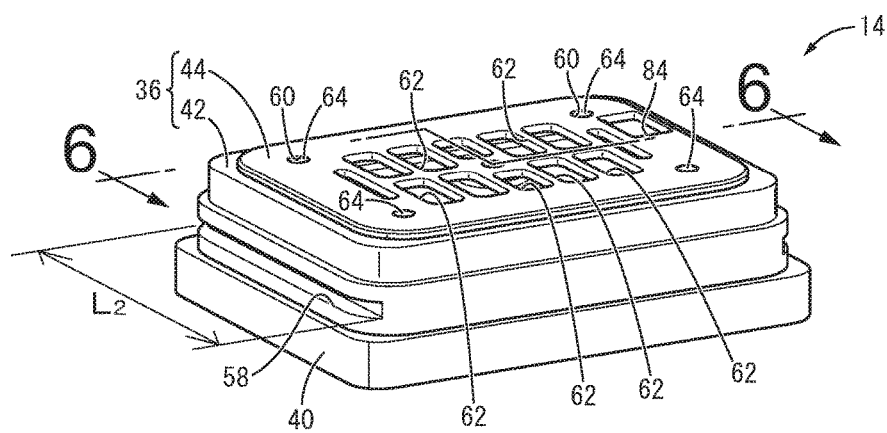
FIG. 5 is a perspective view of an orifice assembly constituting the engine mount shown in FIG. 1.

In the partition member 36, an orifice passage 82 is formed that communicates the pressure-receiving chamber 78 and the equilibrium chamber 80 with one another. The upper opening of the peripheral groove 54 that is formed in the partition member main body 42 is covered by the lid plate member 44 to form a tunnel-shaped passage. This passage is communicated with the pressure-receiving chamber 78 through an upper communication hole 84 formed in the lid plate member 44 as shown in FIG. 5 at one end, and with the equilibrium chamber 80 through a lower communication hole 86 formed in the partition member main body 42 as shown in FIG. 6 at the other end, thereby forming the orifice passage 82. The tuning frequency of this orifice passage 82, which is the resonance frequency of the flowing fluid, is set to a low frequency corresponding to the low-frequency vibration such as engine shake, by adjusting the ratio (A/L) of the passage cross sectional area A to the passage length L considering the wall spring rigidity of the fluid chamber 76. An input of axial vibration of the low frequency to which the orifice passage 82 is tuned causes relative pressure fluctuation between the pressure-receiving chamber 78 and the equilibrium chamber 80, so that the sealed fluid flows between the pressure-receiving chamber 78 and the equilibrium chamber 80 via the orifice passage 82. This exerts the vibration-damping effect, or high attenuating or damping action based of the flow action such as the resonance action of the fluid.

On the upper face of the movable film 66 of the partition member 36, the liquid pressure of the pressure-receiving chamber 78 is exerted via the upper through holes 62, while on the lower face thereof, the liquid pressure of the equilibrium chamber 80 is exerted via the lower through holes 50. Therefore, upon input of a high-frequency, small-amplitude vibration such as idling vibration or driving rumble, the movable film 66 undergoes elastic deformation to transmit the pressure of the pressure-receiving chamber 78 to the equilibrium chamber 80. This transmission avoids substantial obstruct of the pressure-receiving chamber 78 when the orifice passage 82 is substantially clogged due to antiresonance, so that the vibration-damping effect owing to low dynamic spring behavior, or the vibration insulation action is exerted.

For this engine mount 10 having this structure according to the present embodiment, the pin insertion holes 72, 72 are formed between the inner peripheral surface of the second mounting member 20 and the outer peripheral surface of the partition member 36 that are overlapped. The positioning pins 74, 74 are inserted through the pin insertion holes 72, 72 to maintain a fluid-tight connection state for the mount main body 12 and the fluid-filled assembly 14. According to this, it is possible to have a greater degree of design freedom with the forming material, the shape, and the like for the second mounting member 20 and the partition member 36, than the case using the conventional connection structures including clinching and hook locking. This makes it possible to advantageously realize lightening, durability improvement, cost reduction, and the like.

The pin insertion holes 72, 72 of this embodiment are formed by the outer concave grooves 30 opening to the inner surfaces in the left-right direction of the second mounting member 20 and the inner concave grooves 58 opening to the outer surfaces in the left-right direction of the partition member 36. Therefore, the pin insertion holes 72, 72 are formed more easily than being formed as piercing the second mounting member 20 and the partition member 36.

Moreover, the outside parts in the left-right direction of the positioning pins 74, 74 are inserted into the outer concave grooves 30 and thus locked relative to the second mounting member 20, while the inside parts in the left-right direction of the positioning pins 74, 74 are inserted into the inner concave grooves 58 and thus locked relative to the partition member 36. Therefore, if the second mounting member 20 and the partition member 36 are in the process of relative axial deviation and an external force acts on the positioning pins 74, 74, the positioning pins 74, 74 are less likely to deform, so that the second mounting member 20 and the partition member 36 are stably positioned and retained in a sealing position.

Furthermore, both the parts of the second mounting member 20 where the outer concave grooves 30 are formed and the parts of the partition member 36 where the inner concave grooves 58 are formed have a straight line shape extending in the front-back direction. This provides large locking areas of the positioning pins 74, 74 with respect to the second mounting member 20 and the partition member 36. Consequently, the force acting between the second mounting member 20 and the partition member 36 and the positioning pins 74, 74 as a result of positioning is dispersed, thereby improving durability.

In the present embodiment, the partition member 36, the flexible film 38, and the pressing member 40, which constitute the fluid-filled assembly 14, are relatively connected and fixed before being attached to the mount main body 12. By so doing, those partition member 36, flexible film 38, and pressing member 40 can be treated in whole together, thereby facilitating the work of attaching them to the mount main body 12. Besides, by clamping the outer peripheral part of the flexible film 38 between the partition member 36 and the pressing member 40, the gap between the overlapped surfaces of the flexible film 38 and the partition member 36 is sealed in advance in a fluid-tight manner. Therefore, at the connection part of the mount main body 12 and the fluid-filled assembly 14, only sealing between the partition member 36 and the second mounting member 20 is required, so that the seal structure can be facilitated.

In addition, since the partition member 36, the flexible film 38, and the pressing member 40 are mutually connected in advance, by positioning the partition member 36 and the second mounting member 20 with the positioning pins 74, the flexible film 38 and the pressing member 40 can be also positioned to the second mounting member 20. Besides, by inserting the partition member 36 into the second mounting member 20, the pressing member 40 can be disposed outside the second mounting member 20 in the axial direction. Therefore, it is possible to reduce the axial dimension of the second mounting member 20 and the left-right width dimension of the bottom end of the engine mount 10.

In the engine mount 10 of this embodiment, the pin insertion holes 72 are formed on the respective left and right sides of the mount central axis. Into the pair of left and right pin insertion holes 72, 72, the respective positioning pins 74 are inserted. This positions the mount main body 12 and the fluid-filled assembly 14 more stably to achieve a seal structure with excellent reliability.

The pair of left and right positioning pins 74, 74 are integrally constructed, namely, connected to each other by the proximal end connecting part 75. Consequently, it is possible to insert the pair of left and right positioning pins 74, 74 into the left and right pin insertion holes 72, 72 at the same time, thereby facilitating the insertion work. Moreover, during the work of inserting the positioning pins 74, 74 into the pin insertion holes 72, 72, the worker can grip the proximal end connecting part 75, so that treating of the positioning pins 74, 74 gets easier. Furthermore, by inserting the positioning pins 74, 74 into the pin insertion holes 72, 72 up to positions such that the proximal end connecting part 75 comes in contact with the second mounting member 20, the positioning pins 74, 74 can be easily inserted into the pin insertion holes 72, 72 up to appropriate insertion positions.

Figure 10:
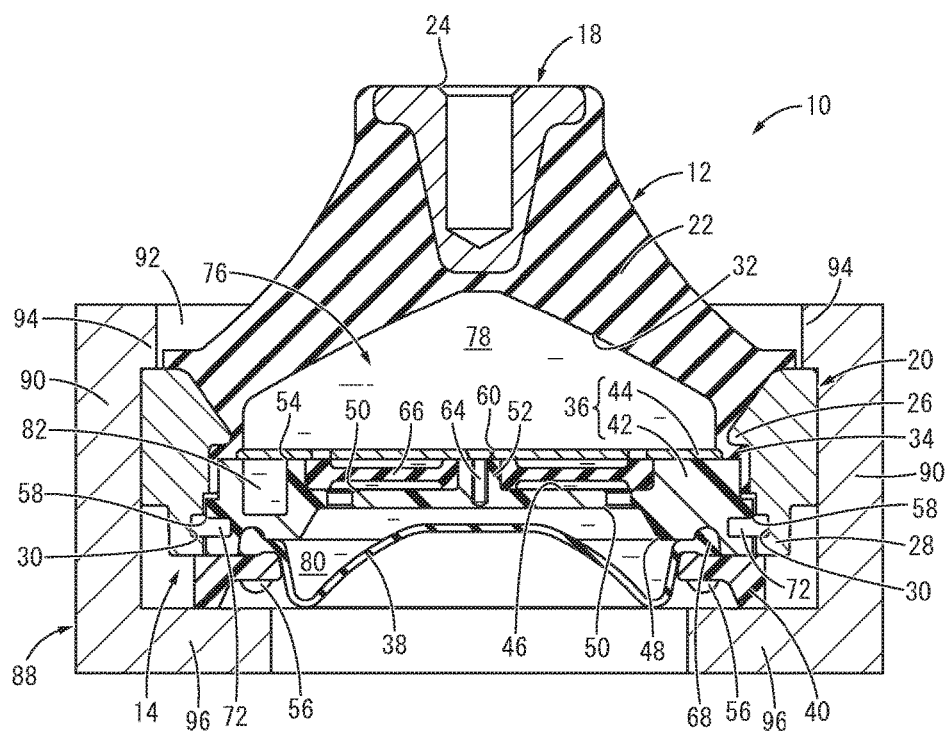
FIG. 10 is a cross sectional view showing the engine mount shown in FIG. 1 being attached to a bracket.

As FIG. 10 shows, it is also possible to mount a bracket 88 to the second mounting member 20 of the engine mount 10, so that the seal structure between the second mounting member 20 and the partition member 36 is maintained by the bracket 88 when the bracket 88 is mounted.

Specifically, for example, the bracket 88 includes a pair of left and right side walls 90, 90 covering the outside of the second mounting member 20 in the left-right direction and a front wall 92 integrally connecting the front ends of the side walls 90 to one another. Besides, the side walls 90 have top contact parts 94 integrally formed therewith projecting inward in the left-right direction from the upper ends. On the other hand, the side walls 90 have bottom contact parts 96 integrally formed therewith projecting inward in the left-right direction from the lower ends to face the top contact parts 94 separately in the up-down direction.

Then, the engine mount 10 is inserted into the bracket 88 forward from the back side. This overlaps the upper surface of the second mounting member 20 with the top contact parts 94 directly or indirectly, while overlapping the lower face of the pressing member 40 with the bottom contact parts 96 directly or indirectly. As a result, the mount main body 12 and the fluid-filled assembly 14 are clamped in the up-down direction between the top contact parts 94 and the bottom contact parts 96, whereby the mount main body 12 and the fluid-filled assembly 14 are relatively positioned in the axial direction. Consequently, the seal rubber layer 34 is kept as compressed in the up-down direction between the seal protrusion 26 of the second mounting member 20 and the partition member 36, thereby keeping the fluid-tightly sealed state of the space between the second mounting member 20 and the partition member 36.

In this state where the bracket 88 is mounted, the second mounting member 20 and the partition member 36 are maintained in the sealing position by the bracket 88 as is described above, thereby eliminating the need for positioning of the second mounting member 20 and the partition member 36 by the positioning pins 74, 74. Therefore, it is also possible to extract the positioning pins 74, 74 inserted through the pin insertion holes 72, 72 from the pin insertion holes 72 when the bracket 88 is mounted. This can lighten the engine mount 10 and enable repeated use of the positioning pins 74, 74.

Figure 11:
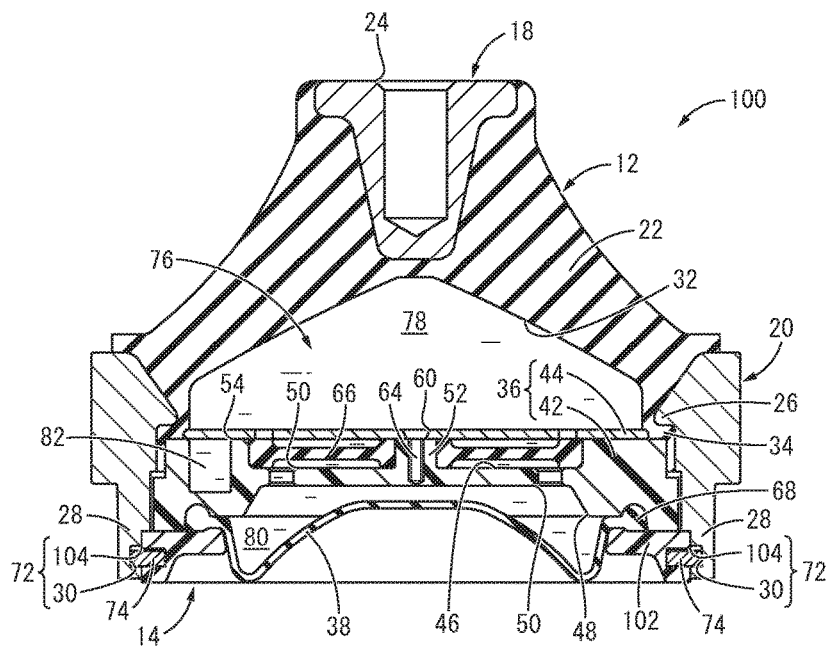
FIG. 11 is a longitudinal cross sectional view showing an engine mount as a second embodiment of the present invention.

FIG. 11 shows an engine mount 100 as a second embodiment of the fluid-filled vibration-damping device according to this invention. The engine mount 100 has a structure wherein the pin insertion holes 72, 72 are formed between the overlapped surfaces of the second mounting member 20 and a pressing member 102. In the description hereafter, for members and parts that are substantially the same as those of the first embodiment, explanation will be omitted by giving the same code numbers in the drawings.

More specifically, in the partition member main body 42, the inner concave grooves 58 as those of the first embodiment are not formed, and inner concave grooves 104, 104 opening to the outer peripheral surface and extending linearly in the front-back direction are formed in the pressing member 102. Besides, the pressing member 102, in addition to the partition member 36, is inserted into the second mounting member 20, and the outer concave grooves 30, 30 of the second mounting member 20 and the inner concave grooves 104, 104 of the pressing member 102 form the pin insertion holes 72, 72.

Figure 12:
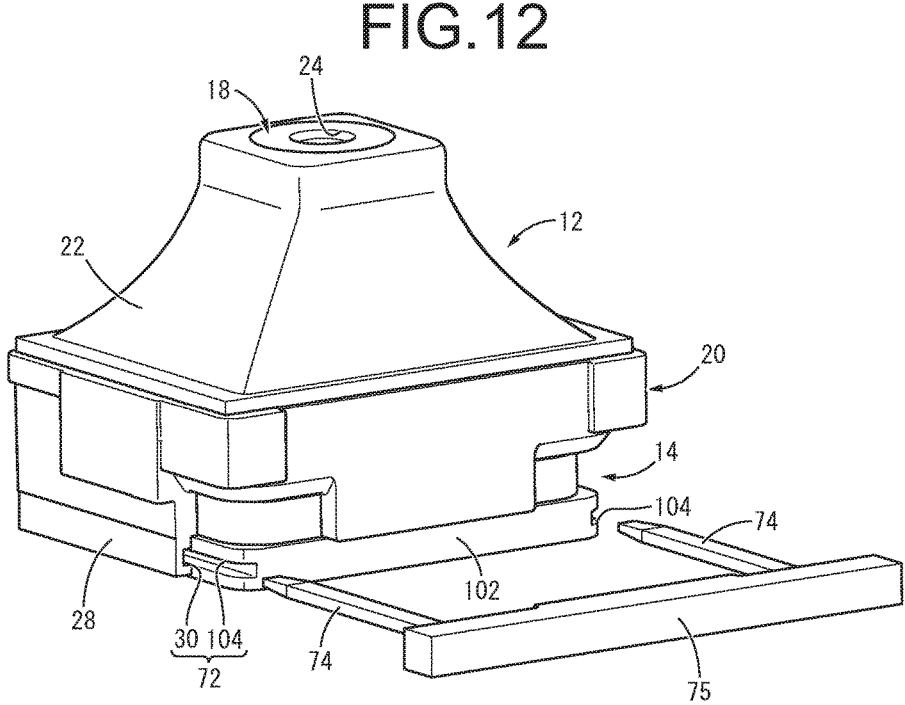
FIG. 12 is a perspective view showing a step of fixing an integrally vulcanization molded component and an orifice assembly to one another with positioning pins, in manufacture of the engine mount shown in FIG. 11.

As FIG. 12 shows, the positioning pins 74, 74 are inserted into the pin insertion holes 72, 72, which are formed between the inner surfaces in the left-right direction of the second mounting member 20 and the outer surfaces in the left-right direction of the pressing member 102 that are overlapped. Consequently, the second mounting member 20 and the pressing member 102 are positioned and kept relatively to seal the gap between the partition member 36 and the second mounting member 20 in a fluid-tight manner. The partition member 36 of the present embodiment has no junction projections 56, and the pressing member 102 and the partition member 36 are not fixed relative to each other. However, the pressing member 102 is positioned to the second mounting member 20, so that the partition member 36 is clamped in the up-down direction between the seal protrusion 26 of the second mounting member 20 and the pressing member 102 so as to position the partition member 36 relative to the second mounting member 20 and the pressing member 102.

In this way, also by forming the pin insertion holes 72, 72 in the pressing member 102 that constitutes the fixation member and locking the pressing member 102 with respect to the positioning pins 74, 74 in the axial direction, it is possible to position the fluid-filled assembly 14 relative to the second mounting member 20 in the sealing position, thereby keeping the sealed state of the wall of the fluid chamber 76.

FIGS. 13 to 16 show an engine mount 110 as a third embodiment of the fluid-filled vibration-damping device according to the present invention. The engine mount 110 has a structure wherein the pin insertion holes 72, 72 are formed in a second mounting member 112 and a pressing member 114 to pierce them in the front-back direction.

Figure 14:
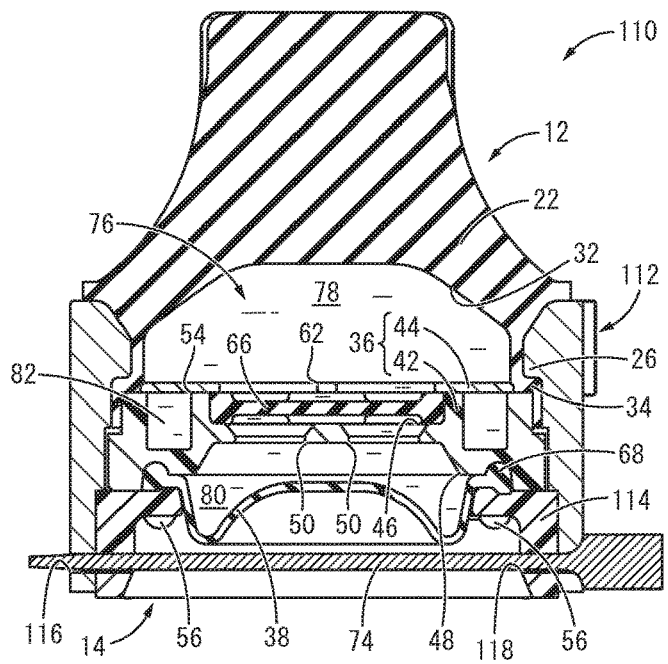
FIG. 14 is a longitudinal cross sectional view of the engine mount shown in FIG. 13, taken along line 14-14 of FIG. 15.
Figure 15:
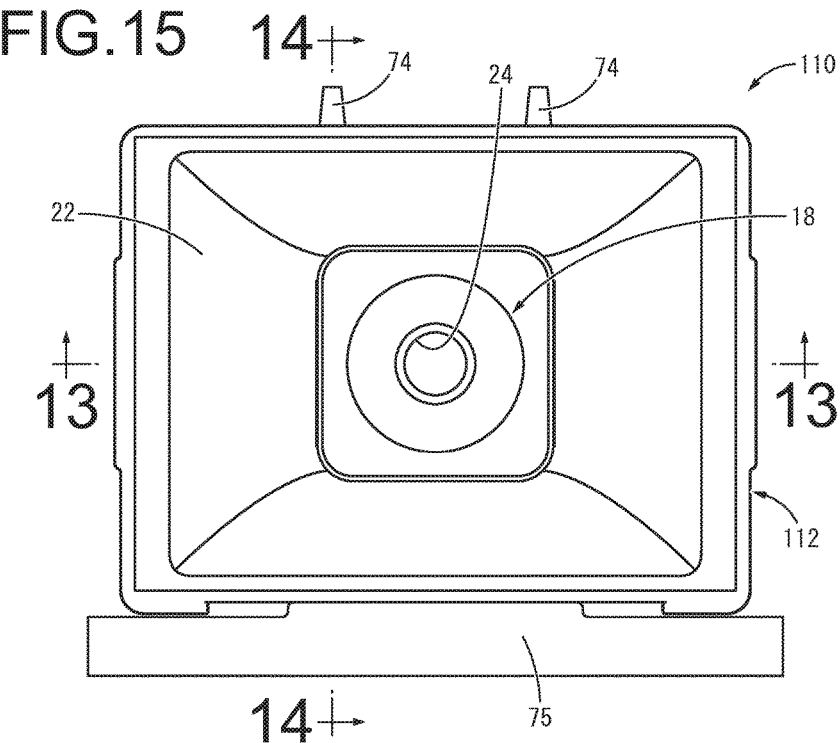
FIG. 15 is a plan view of the engine mount shown in FIG. 13.

Specifically, as FIG. 14 shows, the front and back walls of the second mounting member 112 extend much further downward than the left and right walls thereof, and the pressing member 114 is inserted into the space between the front and back walls of the second mounting member 112, which face each other.

Figure 13:
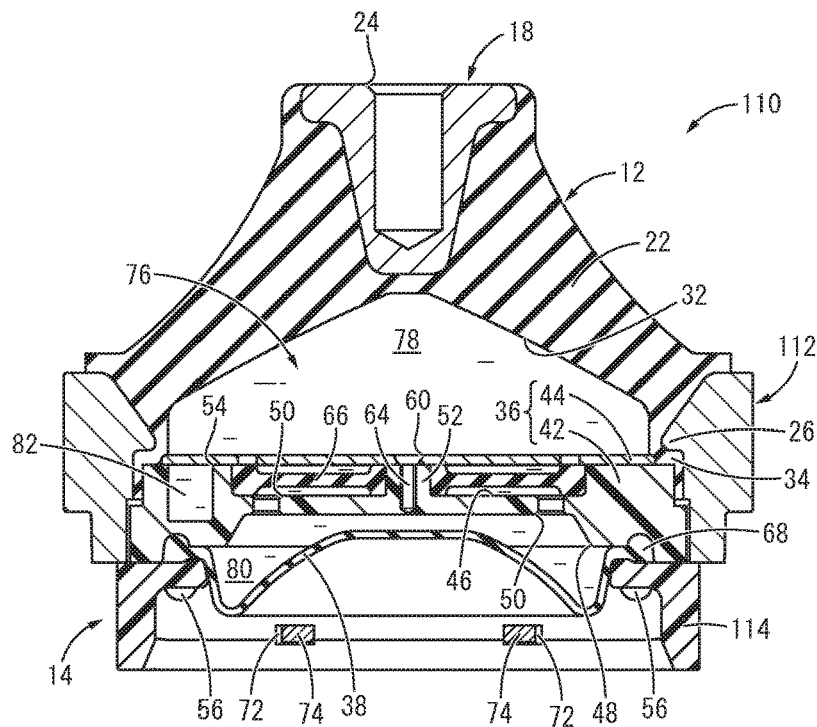
FIG. 13 is a longitudinal cross sectional view showing an engine mount as a third embodiment of the present invention, taken along line 13-13 of FIG. 15.

The pin insertion holes 72 are formed in the lower ends of the front and back walls of the second mounting member 112 and the pressing member 114, which is superposed to them in the front-back direction, to pierce them in the front-back direction. In the present embodiment, front part insertion holes 116 piercing the front parts of the second mounting member 112 and the pressing member 114, and back part insertion holes 118 piercing the back parts thereof are formed to be aligned separately in the front-back direction. Those front part insertion holes 116 and back part insertion holes 118 constitute the pin insertion holes 72. Moreover, as shown in FIG. 13, the pin insertion holes 72 are formed at two positions separate in the left-right direction, respectively, and these pin insertion holes 72, 72 extend linearly in the front-back direction as parallel to each other.

Figure 16:
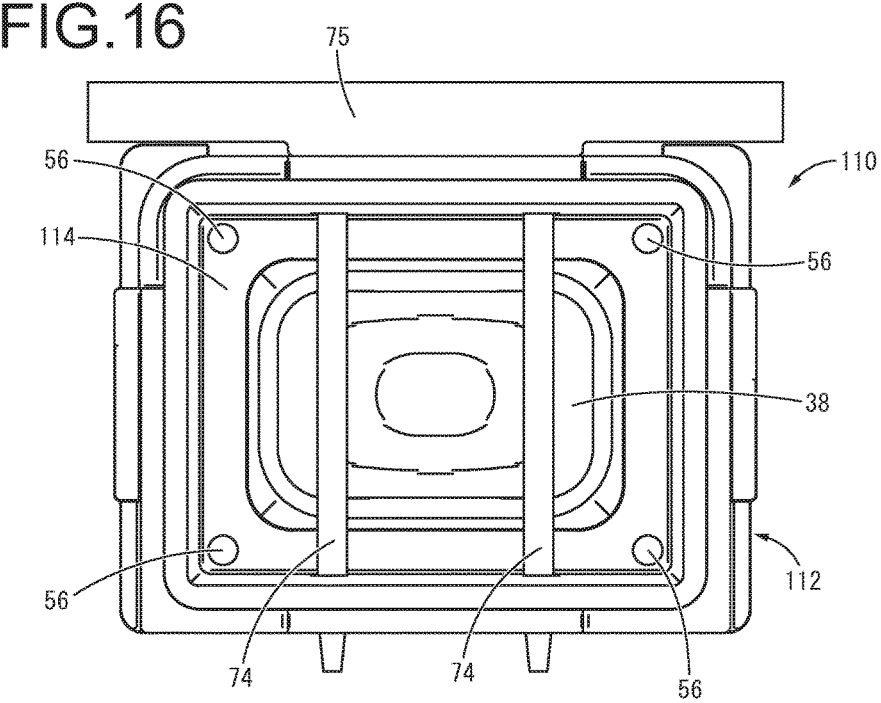
FIG. 16 is a bottom view of the engine mount shown in FIG. 13.
Figure 17:
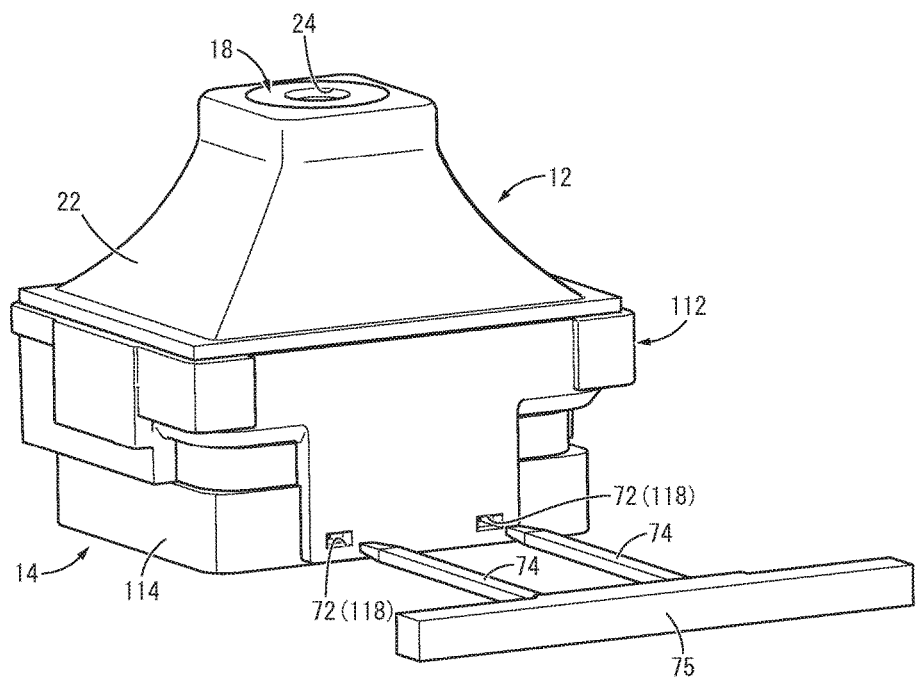
FIG. 17 is a perspective view showing a step of fixing an integrally vulcanization molded component and an orifice assembly to one another with positioning pins, in manufacture of the engine mount shown in FIG. 13.

As FIGS. 14, 16, and 17 show, by inserting the positioning pins 74, 74 through the pin insertion holes 72, 72, the second mounting member 112 and the pressing member 114 are locked in the axial direction to the positioning pins 74, 74, so that those second mounting member 112 and pressing member 114 are positioned in the axial direction in the relative sealing position. Note that the positioning pins 74, 74 that are connected to the pin insertion holes 72 are located on the lower side of the flexible film 38, as shown in FIGS. 13 and 14.

The pin insertion holes 72 are not limited to ones formed between the overlapped surfaces of the second mounting member 20 and the fixation member as shown in the first and second embodiments. As shown in this embodiment, the pin insertion holes 72 may be formed as well such that they pierce the second mounting member 112 and the fixation member, which comprises the partition member 36 and the pressing member 114 in this embodiment. In other words, the locking is not limited to the structure of the first and second embodiments wherein, when the second mounting member 20 and the fixation member are positioned by the positioning pins 74, one side part in the width direction of the positioning pin 74 is locked to the second mounting member 20, while the other side part in the width direction thereof is locked to the fixation member. The locking may be realized by the structure wherein the positioning pin 74 is locked to the second mounting member 112 at parts in the length direction, while being locked to the fixation member at other parts in the length direction.

In this embodiment, the pin insertion holes 72 are formed penetrating through the second mounting member 112 and the pressing member 114. However, the pin insertion holes 72 can be formed penetrating through the second mounting member 112 and the partition member 36.

The embodiments of this invention are described above. However, the present invention is not limited by the specific description. For example, although the pin insertion hole 72 penetrating linearly is shown as an example of the insertion hole in the aforesaid embodiments, the insertion hole is not always required to extend linearly, and it may be curved or be in a bottomed concave shape without penetration, as long as the insertion of the positioning member is possible. Note that the shape for the positioning member is set as appropriate depending on the shape for the insertion hole and is not limited to a pin. Moreover, for example, it is also possible to insert a separate positioning member into each side opening of the pin insertion hole 72 penetrating linearly as shown in the aforementioned embodiments. Additionally shown as an example in the above-described embodiments is the structure wherein the two positioning pins 74, 74 are integrally connected by the proximal end connecting part 75. However, the proximal end connecting part 75 is not essential, and the plurality of positioning pins may be different members which are separate from each other.

Also shown as an example in the above-mentioned embodiments is the structure wherein the outer peripheral rim of the flexible film 38 is clamped by the partition member 36 and the pressing member 40, which constitute the fixation member. However, it is also possible to employ a structure wherein the fixation member in an annular shape is vulcanization-bonded to the outer peripheral rim of the flexible film, and the second mounting member and the fixation member are relatively positioned by the positioning member, for example. For this structure, by the fixation member bonded to the flexible film being positioned relative to the second mounting member, the partition member is clamped and positioned between the seal protrusion of the second mounting member and the fixation member.

Moreover shown as an example in the aforesaid embodiments is a structure wherein the partition member 36 of the fixation member, is inserted into the second mounting member 20. However, for example, it is possible as well to dispose the annular pressing member of the fixation member externally about the second mounting member, and then insert the positioning member through the insertion hole formed in those pressing member and second mounting member, thereby sealing the gap between those pressing member and second mounting member in a fluid-tight manner.

Furthermore shown as an example in the above-described embodiments is a structure having the second mounting member 20 with a substantial shape of a rectangular tube. However, the present invention is preferably applied also to the fluid-filled vibration-damping device having the second mounting member with a substantial shape of a circular tube. Nevertheless, with the structure wherein each of the second mounting member and the fixation member is locked in relation to the respective side part in the width direction of the positioning member like the first embodiment, it is desirable that the insertion hole extends along the inner peripheral surface of the second mounting member for the purpose of keeping large locking area in the length direction of the positioning member. Therefore, where the insertion hole has a straight line shape for easy insertion of the positioning member, it is desirable that the overlapped surfaces of the second mounting member and the fixation member extend linearly at least at the formation part of the insertion hole.

What is claimed is:

1. A fluid-filled vibration-damping device comprising:
   a first mounting member;
   a tubular second mounting member;
   a main rubber elastic body elastically connecting the first and second mounting members;
   a fluid chamber for which a portion of its wall is constituted by the main rubber elastic body, while another portion of its wall is constituted by a flexible film, the fluid chamber being filled with a non-compressible fluid;
   a fixation member being attached to an outer peripheral rim of the flexible film and being disposed internally in relation to the second mounting member such that the fixation member is superposed to the second mounting member in an axis-perpendicular direction;
   an insertion hole formed in the second mounting member and the fixation member; and
   a positioning member inserted through the insertion hole so as to position the second mounting member and the fixation member at a sealing position relative to each other by axial locking.

2. The fluid-filled vibration-damping device according to claim 1, further comprising
   a partition member provided for dividing the fluid chamber into a pressure-receiving chamber whose wall is partially constituted by the main rubber elastic body and an equilibrium chamber whose wall is partially constituted by the flexible film, wherein
   an outer peripheral part of the flexible film is clamped between the partition member and a pressing member that is fixed to the partition member while being overlapped with the partition member, and
   the fixation member is constituted by including the partition member and the pressing member.

3. The fluid-filled vibration-damping device according to claim 2, wherein the insertion hole of the fixation member is formed in the partition member.

4. The fluid-filled vibration-damping device according to a claim 1, wherein the insertion hole is formed between an inner peripheral surface of the second mounting member and an outer peripheral surface of the fixation member that are overlapped with each other.

5. The fluid-filled vibration-damping device according to claim 4, wherein the inner peripheral surface of the second mounting member and the outer peripheral surface of the fixation member expand linearly in an extension direction of the insertion hole in a formation part of the insertion hole.

6. The fluid-filled vibration-damping device according to claim 1, wherein the insertion hole is formed on each of both sides about a central axis of the second mounting member.

7. The fluid-filled vibration-damping device according to claim 1, further comprising a bracket mounted to the second mounting member, wherein
 in a state where the bracket is mounted, the second mounting member and the fixation member are stably positioned at the sealing position relative to each other so that a space between the second mounting member and the fixation member is sealed in a fluid-tight manner, while the positioning member inserted through the insertion hole is extractable from the insertion hole.

* * * * *